(12) United States Patent
Kapadia et al.

(10) Patent No.: US 12,549,478 B2
(45) Date of Patent: Feb. 10, 2026

(54) PROACTIVE CONVERGENCE OF ENDPOINT REACHABILITY IN DATA CENTERS

(71) Applicant: Cisco Technology, Inc., San Jose, CA (US)

(72) Inventors: Shyam Nayan Kapadia, San Jose, CA (US); Roshan Lal, San Jose, CA (US); Ayan Banerjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/425,988

(22) Filed: Jan. 29, 2024

(65) Prior Publication Data
US 2025/0247330 A1    Jul. 31, 2025

(51) Int. Cl.
*H04L 45/74*    (2022.01)
*H04L 45/02*    (2022.01)
*H04L 45/586*    (2022.01)

(52) U.S. Cl.
CPC ............ *H04L 45/586* (2013.01); *H04L 45/02* (2013.01); *H04L 45/74* (2013.01)

(58) Field of Classification Search
CPC ........ H04L 45/586; H04L 45/02; H04L 45/74
USPC ........................................................ 709/238
See application file for complete search history.

(56) References Cited

U.S. PATENT DOCUMENTS 11,870,695 B1 * 1/2024 Hensler .................. H04L 45/76
12,003,377 B1 * 6/2024 Patil .................... G06F 9/45558

2012/0173757 A1    7/2012 Sanden
2013/0086236 A1 * 4/2013 Baucke .................. H04L 45/50
                                                                           709/223
2014/0064104 A1 * 3/2014 Nataraja ............... H04L 61/103
                                                                           370/254

(Continued)

FOREIGN PATENT DOCUMENTS

CN         102821023 A   *   12/2012
CN         109495368 A   *   3/2019          H04L 61/5053

(Continued)

OTHER PUBLICATIONS

Bitar, et al., "Cloud Networking: Framework and VPN Applicability", Internet Engineering Task Force, Standard Working Draft, Oct. 25, 2011, pp. 1-32.

(Continued)

*Primary Examiner* — Moustafa M Meky
*Assistant Examiner* — Kidest Mendaye
(74) *Attorney, Agent, or Firm* — Lee & Hayes, P.C.

(57) ABSTRACT

This disclosure describes techniques and mechanisms to enable proactive convergence of endpoints in a network corresponding to virtual machine mobility scenarios. The techniques may be used individually or together to reduce convergence times and improve network security. The techniques may include proactively exchanging IP-MAC binding information between an old location and a new location of a virtual machine; (2) utilizing a route reflector and a convergence efficient flood order to update the location of the virtual machine at the old location to point to the new location; (3) proactively poisoning the route to the virtual machine at the old location; and (4) utilizing an orchestrator to proactively notify leaf(s) of reachability information of the virtual machine prior to or during migration of the virtual machine.

20 Claims, 8 Drawing Sheets

(56) References Cited

U.S. PATENT DOCUMENTS

| | | | |
|---|---|---|---|
| 2014/0317616 A1* | 10/2014 | Chu | G06F 9/45533 |
| | | | 718/1 |
| 2015/0163192 A1 | 6/2015 | Jain et al. | |
| 2016/0134526 A1* | 5/2016 | Maino | G06F 9/45558 |
| | | | 709/226 |
| 2016/0274926 A1 | 9/2016 | Narasimhamurthy et al. | |
| 2018/0302321 A1 | 10/2018 | Manthiramoorthy et al. | |
| 2018/0309685 A1* | 10/2018 | Srinivasan | H04L 61/103 |
| 2021/0200578 A1 | 7/2021 | Gao et al. | |
| 2022/0263865 A1 | 8/2022 | Sharma et al. | |
| 2022/0385576 A1* | 12/2022 | Kumar | G06F 9/5077 |
| 2024/0202016 A1* | 6/2024 | Patro | G06F 9/45558 |

FOREIGN PATENT DOCUMENTS

| | | | | |
|---|---|---|---|---|
| CN | 110633127 A | * | 12/2019 | G06F 9/45558 |
| CN | 111770035 A | * | 10/2020 | H04L 61/5053 |
| CN | 111988223 A | * | 11/2020 | H04L 12/4633 |
| CN | 114553793 A | | 5/2022 | |
| WO | WO2021169514 A1 | | 9/2021 | |

OTHER PUBLICATIONS

Search Report and Written Opinion for International Application No. PCT/US2025/013507, Dated Apr. 1, 2025, 13 pages.
Thoria, et al., "Integrated Routing and Bridging in EVPN draft-sajassi-l2vpn-evpn-inter-subnet-forwarding-05", Internet Engineering Task Force, Standard Working Draft, Oct. 3, 2014, pp. 1-26.

* cited by examiner

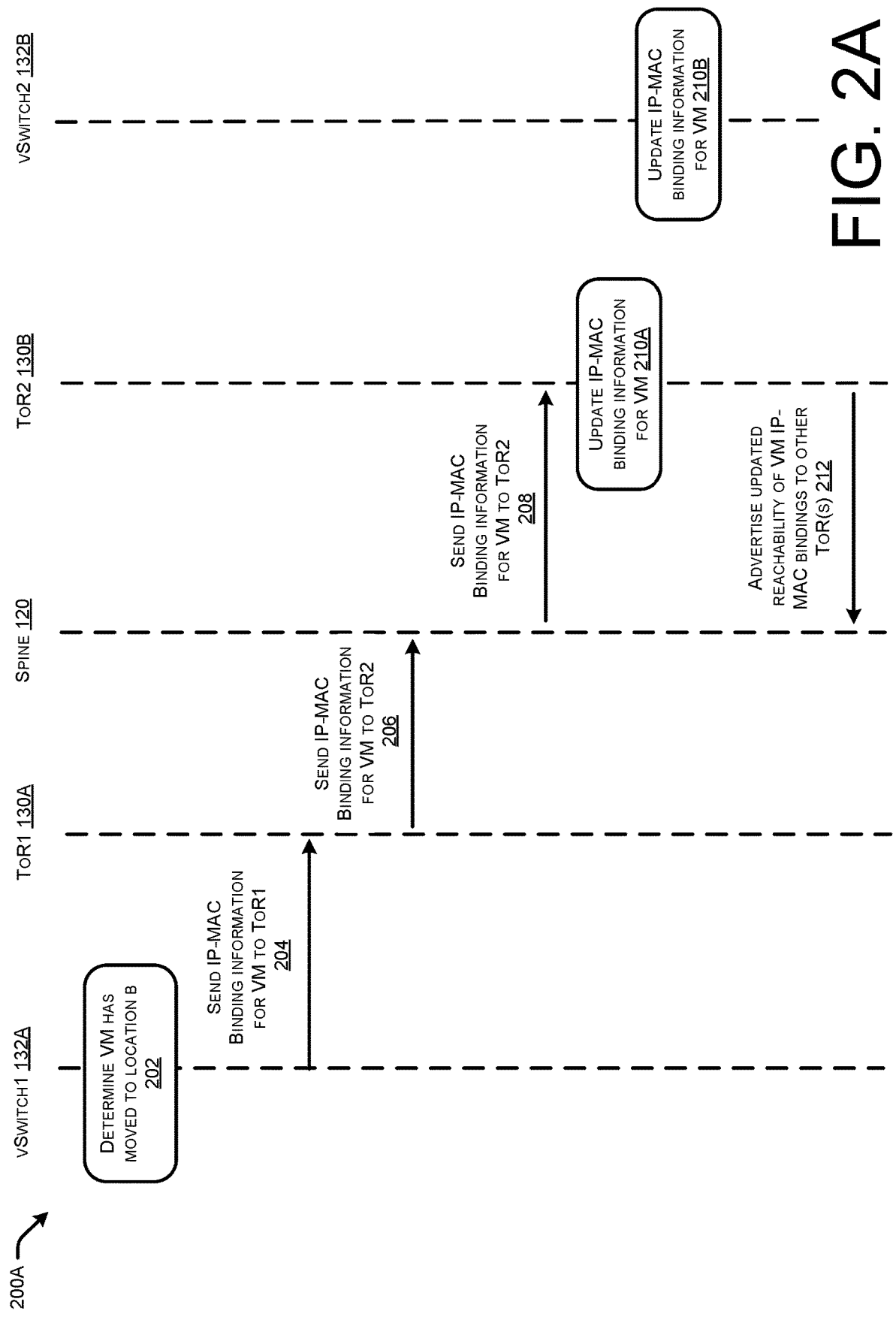

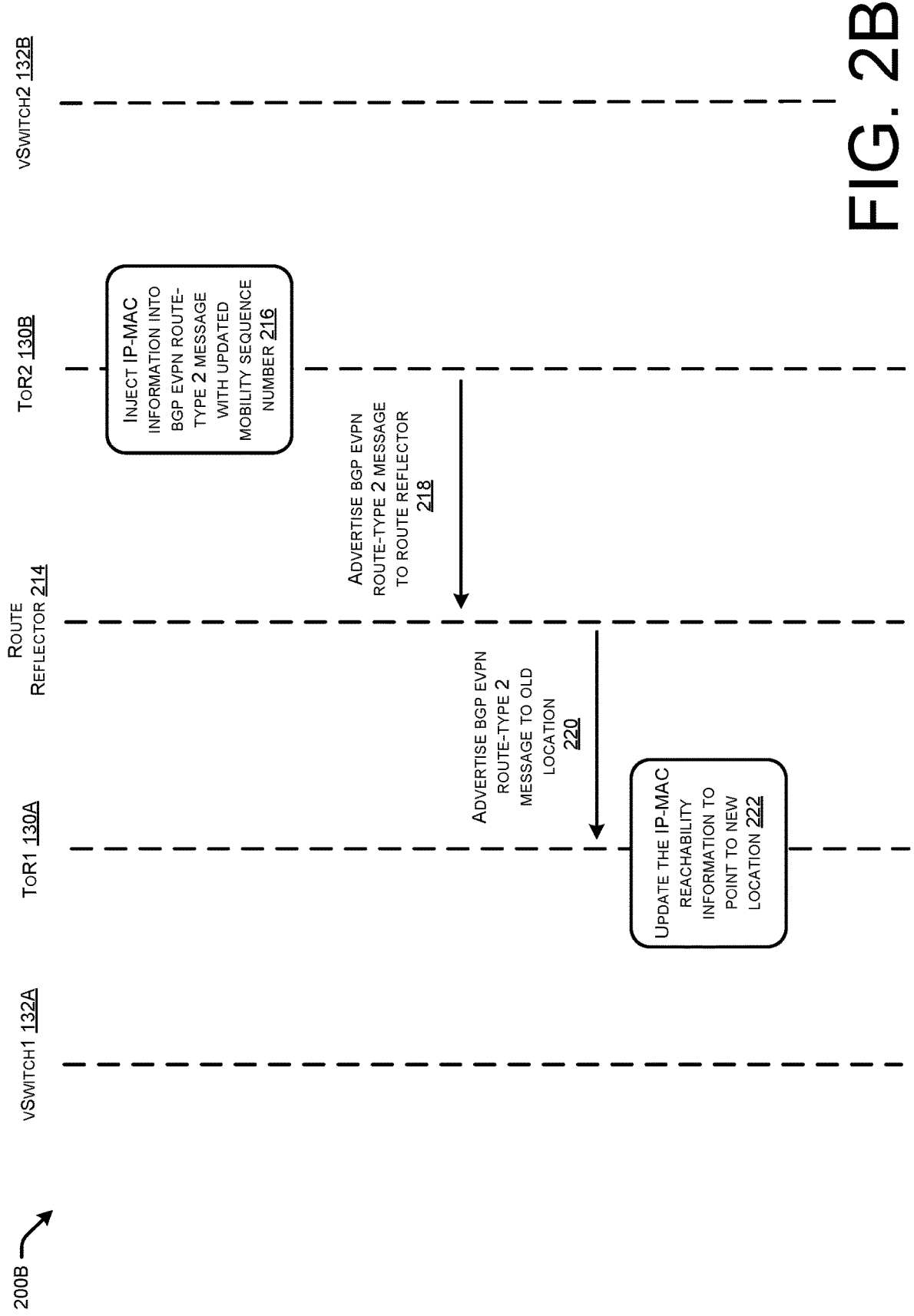

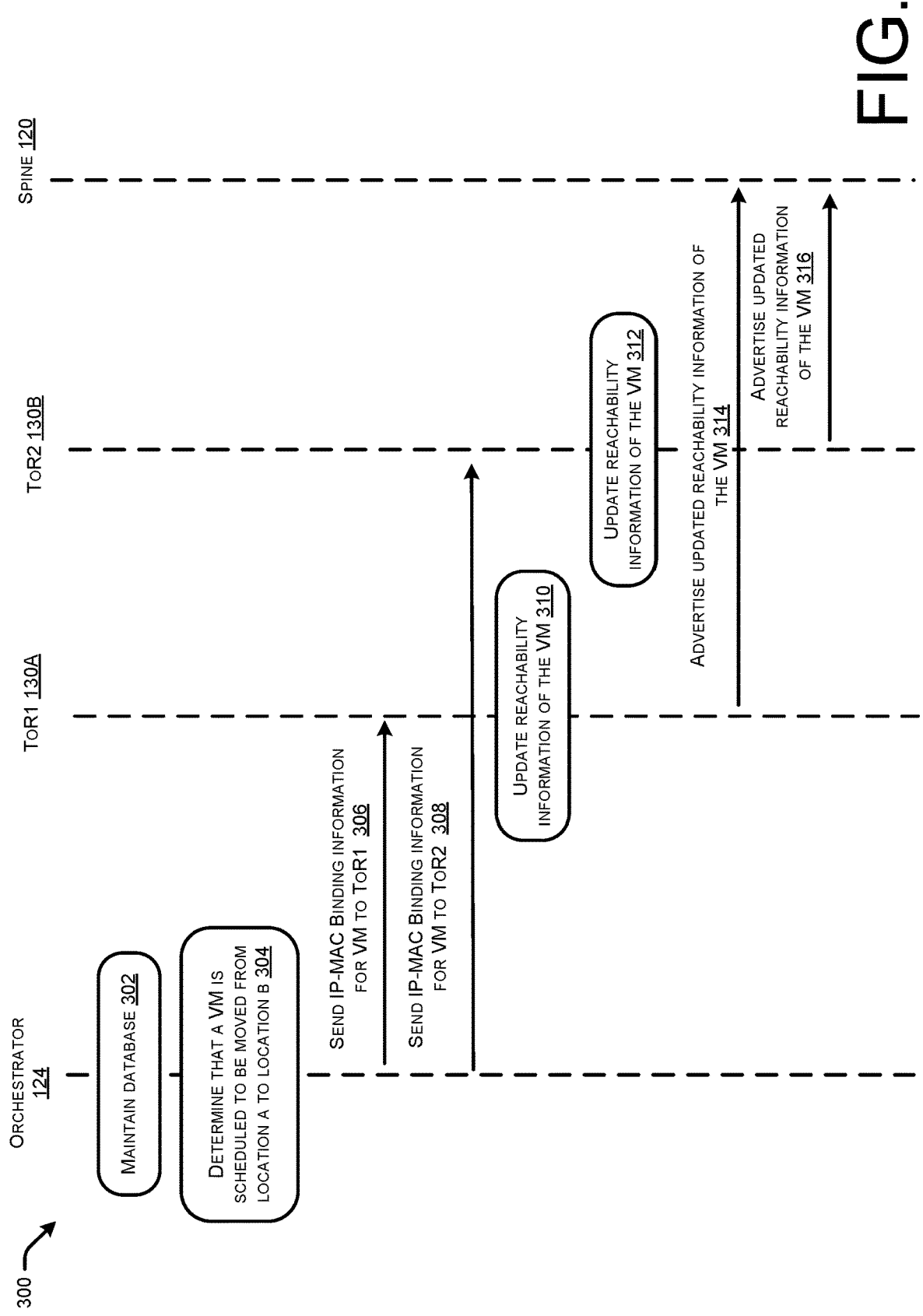

PROACTIVE CONVERGENCE OF ENDPOINT REACHABILITY IN DATA CENTERS

TECHNICAL FIELD

The present disclosure relates generally to the field of networking, and more particularly to techniques for enabling proactive convergence of endpoint reachability in data center network fabrics.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, virtual extensible LANs (VXLAN), ethernet virtual private networks (EVPNs), Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In a typical data center deployment, virtual machines (VMs) may be located in one or more servers. The one or more servers may be located in server racks. One or more VMs may be moved from an old server to a new server due to scheduling optimizations, maintenance windows, better utilization, power efficiency, decommissioning, upgrades etc. These scheduling changes, for example, may also be due to sustainability optimizations.

However, when the VMs are moved, one of the issues that can arise is elongated convergence times. This is true for a variety of data center fabrics, such as VXLAN EVPN. For instance, when a host VM moves to a new server, both the IP and MAC address locality associated with that VM needs to be updated across the entire network fabric. In order to perform these updates, appropriate gratuitous ARP (GARP), reverse ARP (RARP)-triggered ARP, and corresponding Neighbor Discovery (ND) (NS/NA) messages are used to determine the location of the VM at the new network location.

However, in typical VXLAN EVPN data center fabrics, all remote learning is triggered via BGP EVPN control plane messages. Accordingly, convergence times increase as the number of VMs being moved increases. This results in the network being down while the network converges, impacting the connectivity of an end user.

Moreover, each VM can have multiple virtual network interface cards (vNICs). By having multiple vNICs, when VMs are moved there are even more entities that need to converge at scale. Further, convergence is required for both intra-subnet (bridged) or inter-subnet (routed) traffic. However, the GARP/ND messages are per VM and can come at any time. Accordingly, batching is not possible without significantly increasing the convergence time.

Convergence times further increase if there are a large number of ToRs (VTEPs) where the subnet and/or VRF spans. Today for example, it is possible to have 512 or more ToRs in a single fabric based on the type of switch used. Thus, when a number of VM moves take place simultaneously, this creates a scalability challenges and the end user connectivity suffers due to the increased convergence time.

Accordingly, there is a need to improve convergence and reduce downtime as networks scale in size.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-2C illustrate flow diagrams of example communications occurring in the control plane according to various embodiments described herein.

FIG. 3 illustrates a flow diagram of example communications occurring in the management plane according to various embodiments described herein.

DESCRIPTION OF EXAMPLE EMBODIMENTS

Overview

Figure 1:
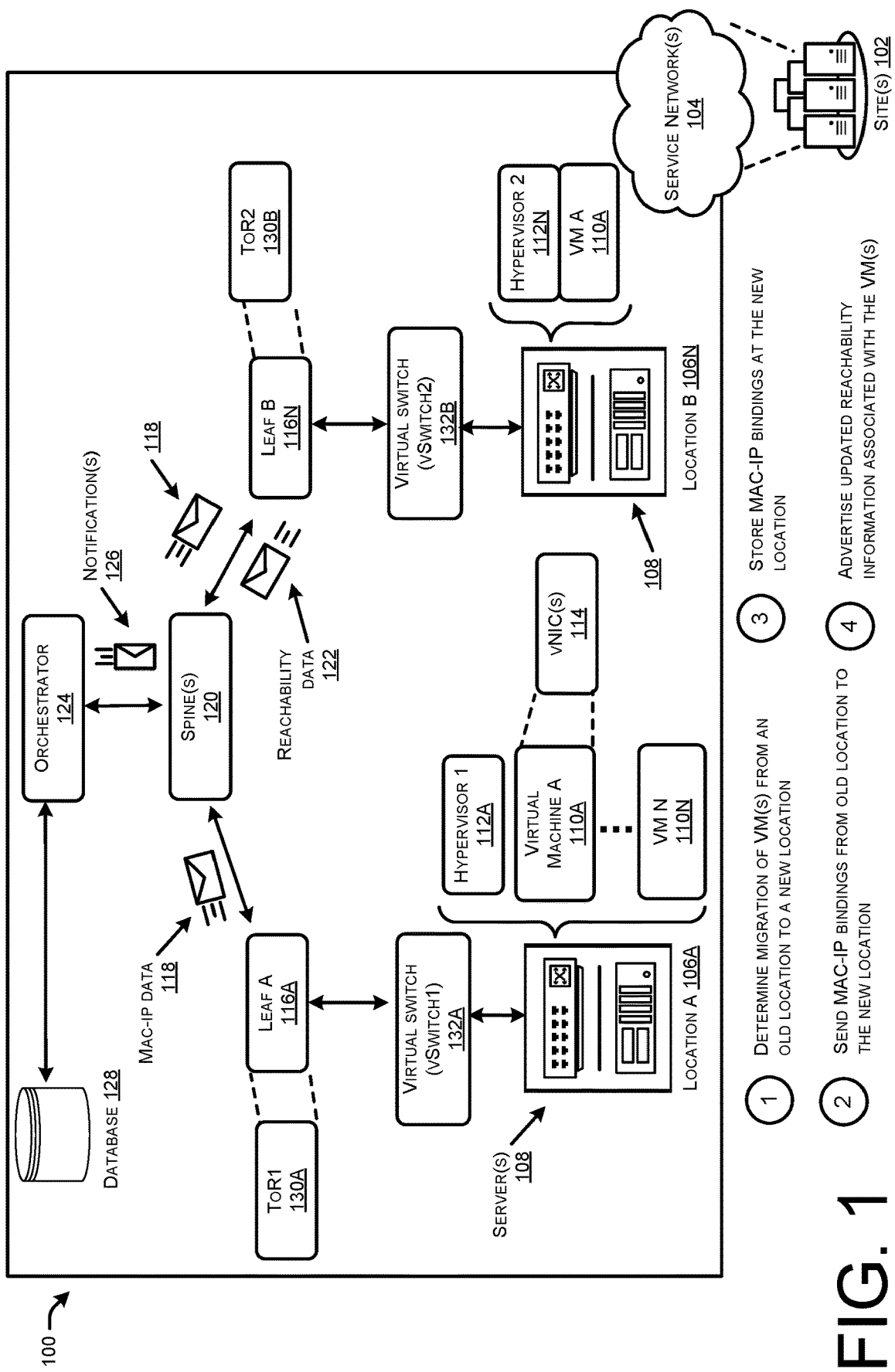
FIG. 1 illustrates a system-architecture diagrams of an environment in which proactive convergence of endpoint reachability is supported.

The present disclosure relates generally to techniques for enabling proactive convergence of endpoint reachability in data center network fabrics.

A method to perform techniques described herein, where the method may be associated with a control plane of a network. In some examples, the method may comprise determining that a virtual machine (VM) is moved from a first location to a second location, the first location being associated with a first top of rack (ToR) of a plurality of ToRs within the network, and the second location being associated with a second ToR of the plurality of ToRs. The method may include receiving, at the second location, a message comprising a MAC address and one or more IP addresses associated with the VM. The method may also include storing, at the second location, the MAC address associated with the VM and the one or more IP addresses associated with the VM. The method may further include advertising, by the second location and to the plurality of ToRs, reachability information of the VM, the reachability information comprising one or more IP-MAC bindings.

Another method to perform techniques described herein may be associated with a management plane of a network. The method may be implemented by a VM orchestrator of the network. The method may include maintaining, by the VM orchestrator, a database comprising mappings of connectivity information between network modules of VMs and leaf nodes of the network. The method may include determining that a VM is scheduled to be moved from a first server associated with a first ToR at a first location to a second server associated with a second ToR at a second location. The method may further include sending, to the first ToR at the first location, a first notification comprising reachability information of the VM, the reachability information including an indication of the second location to enable the first ToR to update the reachability information of the VM to the second location. The method may include sending, to the second ToR at the second location, a second notification comprising the reachability information of the VM to enable the second ToR to update the reachability information of the VM to the second location.

Additionally, the techniques described herein may be performed by a system and/or device having non-transitory computer-readable media storing computer-executable instructions that, when executed by one or more processors, performs the method described above.

EXAMPLE EMBODIMENTS

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, virtual extensible LANs (VXLAN), ethernet virtual private networks (EVPNs), Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In a typical data center deployment, virtual machines (VMs) may be located in one or more servers. The one or more servers may be located in server racks. One or more VMs may be moved from an old server to a new server due to scheduling optimizations, maintenance windows, better utilization, power efficiency, decommissioning, upgrades etc. These scheduling changes, for example, may also be due to sustainability optimizations.

However, when the VMs are moved, one of the issues that can arise is elongated convergence times. This is true for a variety of data center fabrics, such as VXLAN EVPN. For instance, when a host VM moves to a new server, both the IP and MAC address locality associated with that VM needs to be updated across the entire network fabric. In order to perform these updates, appropriate gratuitous ARP (GARP), reverse ARP (RARP)-triggered ARP, and corresponding Neighbor Discovery (ND) (NS/NA) messages are used to determine the location of the VM at the new network location.

However, in typical VXLAN EVPN data center fabrics, all remote learning is triggered via BGP EVPN control plane messages. Accordingly, convergence times increase as the number of VMs being moved increases. This results in the network being down while the network converges, impacting the connectivity of an end user.

Moreover, each VM can have multiple virtual network interface cards (vNICs). By having multiple vNICs, when VMs are moved there are even more entities that need to converge at scale. Further, convergence is required for both intra-subnet (bridged) or inter-subnet (routed) traffic. However, the GARP/ND messages are per VM and can come at any time. Accordingly, batching is not possible without significantly increasing the convergence time.

Convergence times further increase if there are a large number of ToRs (VTEPs) where the subnet and/or VRF spans. Today for example, it is possible to have 512 or more ToRs in a single fabric based on the type of switch used. Thus, when a number of VM moves take place simultaneously, this creates a scalability challenges and the end user connectivity suffers due to the increased convergence time.

Accordingly, there is a need to improve convergence and reduce downtime as networks scale in size.

This disclosure describes techniques and mechanisms for enabling proactive convergence of endpoint reachability in data center network fabrics. For instance, the techniques may be associated with a control plane of a network. In some examples, the techniques may comprise determining that a virtual machine (VM) is moved from a first location to a second location, the first location being associated with a first top of rack (ToR) of a plurality of ToRs within the network, and the second location being associated with a second ToR of the plurality of ToRs. The techniques may include receiving, at the second location, a message comprising a MAC address and one or more IP addresses associated with the VM. The techniques may also include storing, at the second location, the MAC address associated with the VM and the one or more IP addresses associated with the VM. The method may further include advertising, by the second location and to the plurality of ToRs, reachability information of the VM, the reachability information comprising one or more IP-MAC bindings.

Additionally, the techniques may be associated with a management plane of a network. The techniques may be implemented by a VM orchestrator of the network. The techniques may include maintaining, by the VM orchestrator, a database comprising mappings of connectivity information between network modules of VMs and leaf nodes of the network. The techniques may include determining that a VM is scheduled to be moved from a first server associated with a first ToR at a first location to a second server associated with a second ToR at a second location. The techniques may further include sending, to the first ToR at the first location, a first notification comprising reachability information of the VM, the reachability information including an indication of the second location to enable the first ToR to update the reachability information of the VM to the second location. The techniques may include sending, to the second ToR at the second location, a second notification comprising the reachability information of the VM to enable the second ToR to update the reachability information of the VM to the second location.

In some examples, the network may comprise a service network. In some examples, the network may correspond to a data center that implements a VXLAN BGP EVPN data fabric.

In some examples, the system may utilize a route reflector and a convergence efficient flood order to update the location associated with the virtual machine at the first location first. For instance, the second ToR may inject the IP-MAC binding information into a BGP EVPN Route-type 2 message with and updated mobility sequence number. In some examples, the route reflector may utilize the updated mobility sequence number to reflect the BGP EVPN Route-type 2 message to the first ToR, to enable the first ToR to update the location associated with the virtual machine to the second location.

In some examples, the system may proactively poison the route to the first location. For instance, the first ToR may receive a message from the network module (e.g., virtual switch or hypervisor). The message may comprise a RARP packet. In some examples, the RARP packet includes MAC address(es) associated with the vNIC(s) of the virtual machine. In some examples, the first ToR may process the RARP packet on its host facing ports. For instance, the first ToR may identify IP address(es) (e.g., IPv4 and/or IPv6 addresses) associated with the MAC address(es). The first ToR may influence the routing advertisements for reachability of the IP address(es), such that the route to the first ToR is poisoned. For instance, the first ToR may update routing table(s) to indicate the virtual machine is unreachable at the first ToR.

In this way, network traffic may start flowing to the VM as soon as the VM powers up and is able to accept traffic. Thus, as the network has already converged, the system does not need to handle any RARP based broadcast packets at the old location. Accordingly, network transmissions may be reduced, thereby improving network speed. Further, convergence time to the new location of the VM is reduced, thereby reducing downtime of the VM. Moreover, by utilizing the route reflector to update the first location, the techniques enable all traffic directed to the virtual machine at the first ToR to be re-routed to the second location automatically, thereby preventing the traffic from being dropped. Further, by proactively poisoning the route to the virtual machine at the first location, the techniques notify the network of the virtual machine being moved, thereby preventing traffic from being sent to the first ToR.

In some examples, the network modules may comprise virtual switch(es) and/or hypervisor(s). In some examples, the leaf nodes may comprise ToR(s) and/or VTEP(s). In some examples, the VM orchestrator may proactively utilize a management plane workflow to notify one or more of the leaf node(s) (e.g., ToR(s)/VTEP(s)) of the second location of the virtual machine. In some examples, the notification may comprise information associated with the second ToR and/or second VTEP. In some examples, management plane signaling may be utilized to inject the information associated with moving the virtual machine to the second location into the first ToR and/or the second ToR. Moreover, in some examples, the notification may comprise an early move notification that is signed by the VM orchestrator using a key (e.g., public or private).

In this way the ToR(s) at the leaf nodes may be aware of the impending move of the virtual machine, such that the ToR(s) can proactively advertise the IP/MAC reachability of the virtual machine even prior to the VM move finishing. Moreover, by utilizing the key, the techniques prevent spoofing from occurring, thereby improving network security.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagrams of an environment 100 in which proactive convergence of endpoint reachability is supported.

In some examples, the environment 100 may include a service network 104 associated with one or more site(s) 102. The service network(s) 104 may include devices housed or located in one or more data centers. The service network may include one or more networks implemented by any viable communication technology, such as wired and/or wireless modalities and/or technologies. The service network may include any combination of Personal Area Networks (PANs), Local Area Networks (LANs), Wireless LANs, Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof. The service network may include devices, virtual resources, or other nodes that relay packets from one network segment to another by nodes in the computer network. The service network may include multiple devices that utilize the network layer (and/or session layer, transport layer, etc.) in the OSI model for packet forwarding, and/or other layers.

The site(s) 102 may correspond to one or more data centers. The one or more data centers may be physical facilities or buildings located across geographic areas that designated to store networked devices that are part of a manufacturer. The data centers may include various network devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings. In some examples, the site(s) comprise network device(s), which may correspond to any computing device, routers, switches, computers, or any other type of network device.

In some examples, the service network 104 comprises a VXLAN BGP EVPN network fabric. For instance, the service network 104 may comprise a fabric of one or more spine(s) 120 and one or more leaf(s) 116 (illustrated as, but not limited to Leaf A 116A and Leaf B 116N).

In some examples, the environment 100 may comprise server(s) 108. In some examples, such as where the service network 104 comprises a VXLAN BGP EVPN network fabric, the server(s) 108 may comprise virtualized server(s). In some examples, the service network 104 may comprise a plurality of server(s) 108 associated with a plurality of location(s) 106. For instance, the server(s) 108 may correspond to one or more server racks associated with one or more location(s) 106. For instance, a first server rack may be associated with a first location (e.g., location A 106A). In some examples, a second location (e.g., location B 106N) may correspond to additional server racks within the service network 104.

In some examples, each server 108 may comprise one or more virtual machine(s) 110 (illustrated as, but not limited to, Virtual Machine A 110A to Virtual Machine N 110N, a hypervisor 112 (illustrated as, but not limited to, hypervisor 1 112A, hypervisor 2 112N), and/or a virtual switch 132 (illustrated as, but not limited to, vSwitch1 132A and vSwitch 2 132B). In some examples, the virtual machine(s) 110 may comprise one or more vNICs 114. For instance, each vNIC may comprise a MAC address. In some examples, the hypervisor 112 may comprise software that enables a server 108 to run multiple virtual machine(s) 110 on a single server. For instance, in some examples, the hypervisor 112 may comprise one or more software modules, such as VMware vSphere ESXi, KVM, or any other suitable hypervisor. In some examples, the hypervisor 112 may run as a software module on one or more of the virtual machine(s) 110.

In some examples, the virtual switch 132 may be configured to communicate with the hypervisor 112, the virtual machine 110, and the ToR 130 (illustrated as, but not limited to, ToR1 130A and ToR 2 130B) via a virtual switch 132. In some examples, the virtual switch 132 comprises a software-based network switch that operates within a virtualized environment. In some examples, the ToR(s) 130 are configured to route network traffic (e.g., such as IP address(es), including IPv4 and IPv6 addresses) to a corresponding virtual machine via the virtual switch 132 and/or the hypervisor 112.

In some examples, the virtual switch 132 is configured to communicate with a leaf 116 of the service network 104. For instance, the virtual switch 132 may be configured to send and receive messages with the leaf 116 using any appropriate protocol. For instance, the virtual switch 132 may utilize GARP/NA, RARP, or any other type of data packet. In some examples, the virtual switch 132 may store indications of IP-MAC bindings associated with the corresponding VM (e.g., vSwitch1 132A stores IP-MAC binding(s) for VM A 110A).

In some examples, the leaf 116 may comprise a top of rack switch (ToR 130). For instance, where the service network comprises the VXLAN BGP EVPN fabric, the leaf(s) 116 may comprise virtual tunnel end point(s) (VTEP(s)). In some examples, the VTEP(s) are implemented as a functionality of the ToR(s) 130. In some examples, the ToR(s) 130 are implemented as part of a networking device at the leaf 116 layer. In some examples, a ToR corresponds to the deployment of one or two switches in each server rack, with the servers directly connected to the switches in the rack, enabling the interconnection of servers and switches within the rack.

In some examples, each leaf 116 may be configured to communicate with a spine 120 node of the service network 104. In some examples, the spine 120 may comprise one or more networking device(s). For instance, the leaf 116 may be configured to send MAC-IP data 118 from an old location of the VM A 110A to the new location of the VM A 110A. In some examples, the MAC-IP binding data 118 comprises MAC address data and IP address data associated with the VM A 110A. In some examples the MAC-IP data 118 is sent to the leaf 116 by the virtual switch (e.g., vSwitch1 132A) at the old location (e.g., location A 106A).

In some examples, the leaf 116 may be configured to advertise reachability information 122 to the spine(s) 120 and/or other leaf(s) 116 in the service network 104. In some examples, the reachability information 122 may comprise IP address(es), MAC address(es), and/or information regarding whether a particular virtual machine can receive traffic.

In some examples, the service network 104 may comprise an orchestrator 124. For instance, the orchestrator 124 may correspond to a virtual machine orchestrator (e.g., VMware vCenter, OpenStack, or any other suitable orchestrator). In some examples, the orchestrator 124 may access and/or maintain a database 128. In some examples, the database 128 may comprise mappings of connectivity between vSwitch(es) 132 and ToR(s) 130 (and/or VTEPs) associated with location(s) 106. In some examples, the mappings can be generated and built by the orchestrator 124 built based on link layer LLDP/CDP connectivity information. In some examples. the connectivity information may be populated by a user of the service network 104. Accordingly, by maintaining the database, the orchestrator 124 may be aware of an old location of a virtual machine, as well as a new location where the virtual machine is being moved and/or scheduled to be moved to at a future time.

In some examples, the orchestrator 124 may be configured to send notification(s) 126 to the spine 120 and/or leaf(s) 116. In some examples, the notification(s) 126 may comprise updated reachability information for one or more virtual machine(s) 110. In some examples, the notification(s) 126 may be sent using management plane communication(s). In some examples, the notification(s) 126 may be sent prior to the virtual machine(s) 110 being moved and/or before moving the virtual machine(s) 110 is complete.

Traditionally, after the VM moves to the new server, a RARP is sent out by the hypervisor 112 (or virtual switch) announcing the MAC address associated with the vNIC associated with VM A 110A. The RARP packet uses the source MAC as the MAC address of the vNIC and destination MAC as the broadcast MAC address. In this example, the expectation is that the RARP packet will be flooded within the broadcast domain and hence update the new location at every place where the MAC address of the VM A 110A is stored. The RARP packet is punted to the software on Leaf A 116A that in turn detects that it is the original location announcing reachability for VM A 110A. As a result, it will trigger host verification by determining the IP addresses associated with this MAC address and sending out ARP/ND packets for those validating whether those addresses are still reachable. The ARP/ND packets will eventually reach VM A 110A below vSwitch2 132B at location B 106N, which in turn will respond with the appropriate response. These responses will be captured by Leaf N 116N that in turn will trigger BGP EVPN updates with an updated mobility sequence number thereby eventually resulting in the updates reaching all the VTEPs. Leaf A 116A in turn will then withdraw its stale reachability information for VM A 110A. In typical BGP EVPN environments, where an iBGP Route-Reflector is employed, it will take the Route-type 2 advertisement for the new location of VM A 110A and send it over to all its neighbors. With other hypervisors, or in other environments, VM A 110A may send out a GARP periodically that in turn may trigger the learning of the new location.

However, as noted above, while all this learning of the new location (e.g., location B 106N) of the VM A 110A is happening within the network, both routed and bridged traffic directed to VM A 110A will be lost. In other words, applications having a dependency on the software running on VM A 110A will suffer a downtime. The downtime will be significantly larger as the service network 104 size increases (e.g., more spine(s) and leaf(s), multiple site(s), etc.). Further, as noted above, downtime becomes even worse if there are a large number of VMs involved in the move, as each may have multiple vNICs 114 having multiple IP/MAC addresses. Accordingly, this creates a large window where network traffic intended for VM A 110A flows to the virtual switch (e.g., vSwitch1 132A) at the old location (e.g., location A 106A) that is attached to leaf A 116A.

Unlike existing techniques, the environment 100 corresponds to improvements in convergence when one or more virtual machine(s) 110 are moved.

At "1", the system may determine migration of VM(s) from an old location to a new location. For instance, as illustrated in FIG. 1, the system may determine that VM A 110A has moved from location A 106A to location B 106N. In some examples, the hypervisor 112A may determine that VM A 110A has moved to the new location (e.g., location B 106N).

At "2", the system may send MAC-IP bindings from the old location to the new location. For example, the virtual switch (vSwitch1 132A) at the old location (e.g., location A 106A) may send the IP-MAC binding information of VM A 110A to the ToR2 130B and vSwitch2 132B at the new location (e.g., location B 106N). In some examples, the MAC-IP bindings may be sent as part of a GARP/NA packet. In some examples, the MAC-IP bindings may be sent by vSwitch1 132A at the old location (e.g., location A 106A) in response to receiving a GARP/NA packet from the vSwitch2 132B at the new location (e.g., ToR2 130B at location B 106N).

At "3", the system may store the MAC-IP bindings at the new location. For instance, ToR2 130B can store and learn the updated IP-MAC binding information for VM A 110A. In some examples, the ToR2 130B may store the updated IP-MAC binding information in a proactive manner (e.g., such as before the VM A 110A has actually finished its migration).

At "4", the system may advertise updated reachability information associated with the VM(s). The ToR2 130B at the new location will advertise the reachability of the IP-MAC bindings for VM A 110A to all other ToR(s) in the service network 104 over BGP EVPN thereby allowing the network to be ready to redirect traffic intended for VM A 110A to the new location.

In this way, network traffic may start flowing to the VM as soon as the VM powers up and is able to accept traffic. Thus, as the network has already converged, the system does not need to handle any RARP based broadcast packets at the old location. Accordingly, network transmissions may be reduced, thereby improving network speed. Further, convergence time to the new location of the VM is reduced, thereby reducing downtime of the VM.

Figure 2C:
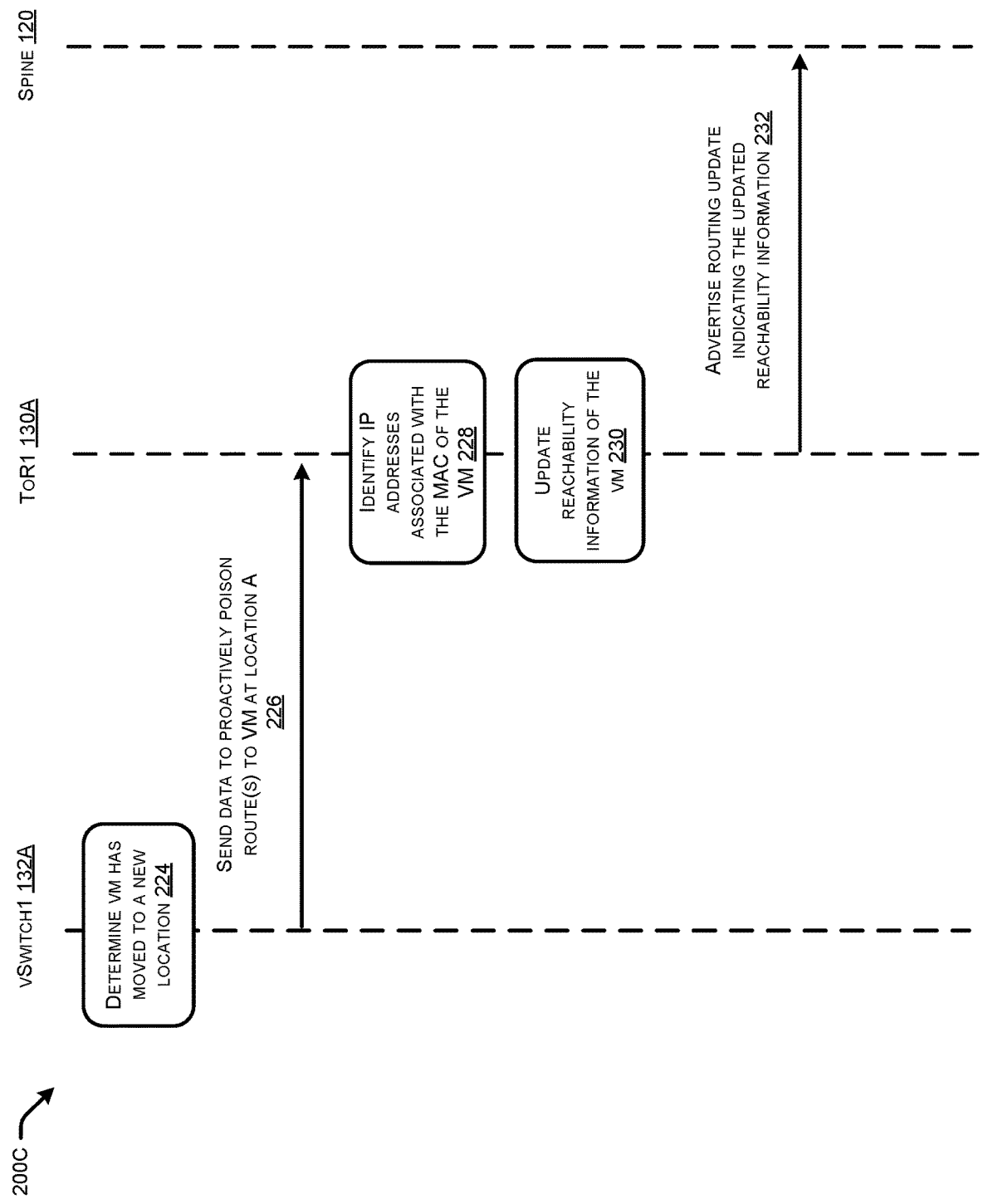

FIGS. 2A-2C illustrate flow diagrams 200A, 200B, and 200C of example communications implemented by the control plane. In some examples, one or more of the steps illustrated in flow diagram 200A of FIG. 2A may be used in addition to and/or in combination with one or more of the steps illustrated in flow diagram 200B of FIG. 2B, flow diagram 200C, and/or FIG. 3. In some examples, one or more of the steps illustrated in FIG. 2B may be used in addition to and/or in combination with the steps of FIG. 2A, FIG. 2C, and/or FIG. 3. In some examples, one or more of the steps illustrated in FIG. 2C may be used in addition to and/or in combination with the steps of FIG. 2A, FIG. 2B, and/or FIG. 3. One or more of the steps illustrated in FIGS. 2A-2C are not limited to the order illustrated. The flow diagrams illustrated may include additional steps and/or may omit one or more of the steps. As noted above, the communications illustrated in FIG. 2A-2C occur in the control plane and may occur after a virtual machine has been moved to a new location and/or while a group of virtual machines are being moved.

In some examples, FIG. 2A illustrates an example flow diagram 200A of example communications corresponding to proactively exchanging IP-MAC binding information between an old location of a virtual machine and a new location of the virtual machine. As illustrated in FIG. 2A, the example system may include vSwitch1 132A, ToR1 130A, Spine 120, ToR2 130B, and vSwitch2 132B as described above. In some examples, the example communications of FIG. 2A may include additional or alternative steps. In some examples, the communications illustrated in FIG. 2A may occur after a virtual machine has been moved from an old location to a new location.

As illustrated in FIG. 2A, at 202, vSwitch1 132A may determine that a virtual machine has moved from location A 106A to a new location (location B). In some examples, the determination that a virtual machine has moved may be made by the hypervisor (e.g., hypervisor1 112A or hypervisor 2 112N). In some examples, vSwitch1 132A may determine that the virtual machine has moved to the new location in response to receiving a message from the new location (e.g., a GARP/NA message sent out by ToR2 130B on behalf of the virtual machine).

At 204, vSwitch1 132A may send IP-MAC binding information for the virtual machine to ToR1, such that the IP-MAC binding information can be sent to ToR2 130B at the new location. In some examples, vSwitch1 132A may send the IP-MAC binding information as part of a RARP packet.

At 206, ToR1 130A may send the IP-MAC binding information for the VM to the spine 120, such that the spine 120 can forward the IP-MAC binding information to ToR2 130B. In some examples, the IP-MAC binding information is sent as part of a GARP/NA packet. In some examples, ToR1 130B may send the IP-MAC binding information using BGP EVPN.

At 208, the spine 120 may forward and/or send the IP-MAC binding information for the virtual machine to ToR2 130B at the new location. In some examples, the IP-MAC binding information is sent as part of a GARP/NA packet.

At 210A, the ToR2 130B at the new location may update the IP-MAC binding information for the virtual machine. In some examples, ToR2 130B may store the updated IP-MAC binding information in memory.

At 210B, vSwitch2 132B may additionally or alternatively update the IP-MAC binding information for the virtual machine. In some examples, ToR2 130B may store the updated IP-MAC binding information in memory.

At 212, ToR2 130B may advertise the updated reachability information of the virtual machine to the spine 120 and/or other ToR(s) 130 within the network. In some examples, the updated reachability information may comprise reachability of the VM with respect to the IP-MAC bindings. In some examples, ToR2 130B may advertise the updated reachability information of the virtual machine using BGP EVPN.

In this way, the system may enable ToR2 130B to proactively learn the updated IP-MAC binding information for the virtual machine. Moreover, by proactively exchanging the IP-MAC binding information between the old location and the new location, reachability of the virtual machine may be proactively advertised by the new location, thereby enabling the network to be ready for traffic redirection to the new location of the virtual machine.

FIG. 2B illustrates a flow diagram 200B of example communications corresponding to the control plane. In some examples, flow diagram 200B corresponds to utilizing a route reflector to update the old location of the virtual machine first, such that network traffic can be re-routed to the new location. As illustrated, the example system may additionally include route reflector 214. For instance, the route reflector 214 may be implemented at the spine 120 of the network. In some examples, the steps of FIG. 2B may occur in response to ToR2 130B at the new location of the virtual machine receiving a the GARP/NA packet. For instance, the GARP/NA packet may be received at step 208 in FIG. 2A above.

As noted above, typically with IGP iBGP EVPN networks, a Route-Reflector (RR) at the spine is employed to "reflect" advertisements to all other EVPN neighbors to avoid a full-mesh iBGP EVPN peering between all ToRs (N BGP sessions versus N^2 messages in a mesh network). However, typically, the route reflector 214 sends out the updated Route-type 2 advertisement to all neighbors and treats them equally (e.g., such that there is no preference as to which ToR receives the advertisement first). Further, when the route reflector advertises the information to the rest of the network, each of the ToRs in the network respond to the route reflector (resulting in the N response).

Unlike traditional techniques, the communications of FIG. 2B enable the route reflector to advertise the updated Route-type 2 advertisement to ToR1 130A first, so that traffic that is directed to the virtual machine at ToR1 130A may then start bouncing to ToR2 130B and the new location. Thus, by forwarding the traffic, the techniques of FIG. 2B prevent a complete drop of communications and improve network convergence.

At 216, ToR2 130B may inject the updated IP-MAC binding information into a BGP EVPN Route-type 2 message that includes an updated mobility sequence number. In some examples, the Type 2 message may be used to advertise reachability within a network. In Type 2 messages, the MAC address is mandatory and IP addresses are optional. The mobility sequence number may indicate a location associated with a virtual machine, with the higher mobility sequence number indicating the most recent information associated with the virtual machine.

At 218, ToR2 130B may advertise the BGP EVPN Route-type 2 message to the route reflector 214 at the spine 120.

At 220, the route reflector 214 may advertise the BGP EVPN Route-type 2 message with the updated IP-MAC information of the virtual machine to ToR1 130A. In some examples, the route reflector 214 may utilize a hub and spoke model and may reflect advertisements using a flood order and/or list. In some examples, the route reflector 214 may advertise the BGP EVPN Route-type 2 message to ToR1 130A first based on using a convergent efficient flood order.

At 222, ToR1 130A may update the IP-MAC reachability information using the BGP EVPN Route-type 2 message, such that ToR1 130A can update the location of the virtual machine to point to the new location and/or ToR2 130B. Thus, all network traffic to ToR1 130A may be re-routed automatically without having to wait for all of the ToRs in the network to be updated.

FIG. 2C illustrates a flow diagram 200C of example communications corresponding to the control plane. In some examples, the communications illustrated in FIG. 2C may correspond to poisoning a network route to the old location of a virtual machine. As noted above, the steps illustrated in FIG. 2C may be implemented independently of FIGS. 2A and/or 2B. In some examples, the steps of FIG. 2C may be used in addition to any of the steps of FIGS. 2A and/or 2B.

At 224, vSwitch1 132A may determine that a virtual machine has moved to a new location. As noted above, vSwitch1 132A may determine this based on hypervisor 1 112A detecting the move and/or receiving a message from ToR2 130B in response to hypervisor 2 112N detecting the move of the virtual machine.

At 226, vSwitch1 132A may send data to ToR1 130A to proactively poison the route to the virtual machine at location A. For instance, the data may be sent as part of a RARP packet. In some examples, the RARP packet may identify the MAC address(es) of vNIC(s) of the virtual machine.

At 228, ToR1 130A may identify IP address(es) associated with the MAC address(es). In some examples, ToR1 130A processes the RARP packet on host facing ports of ToR1 130A. In some examples, the IP address(es) may comprise IPv4 and/or IPv6 address(es).

At 230, ToR1 130A may update reachability information of the virtual machine using the MAC address(es) and IP address(es). For instance, ToR1 130A may update a stored routing table to change a hop count associated with the virtual machine, IP address(es), and/or the MAC address(es) to be unreachable (higher than the maximum number of hops allowed).

At 232, ToR1 130A may send a routing update indicating the updated reachability information. For instance, ToR1 130A may influence the routing advertisements for reachability of the MAC and IP address(es) to include the unreachable hop count. For instance, ToR1 130A may send an advertisement to the spine 120 and/or route reflector 214 including updated IP-MAC binding information in order to poison the route to the virtual machine at location A.

Accordingly, ToR1 130A may poison the route to the virtual machine at the old location, such that each ToR sending traffic to ToR1 can be updated to send traffic to the new location. Thus, by letting the network know about the virtual machine being moved, ToR1 130A can proactively poison the route so that other ToRs will no longer send traffic towards the old location, thereby preventing the traffic from being dropped and reducing convergence times. Thus, control plane flow between leafs of the network may be optimized.

FIG. 3 illustrates a flow diagram 300 of example communications that may be implemented by a management plane of a network. In some examples, the communications in FIG. 3 may occur prior to a virtual machine being moved and/or during a migration of one or more virtual machine(s). In some examples, one or more steps illustrated in FIG. 3 may occur independently of the communications shown in FIGS. 2A-2C. In some examples, the steps of FIG. 3 may be used additionally or alternatively to the steps shown in any of FIGS. 2A-2C. As illustrated, the example system of FIG. 3 may include orchestrator 124, ToR1 130A, Spine 120, and ToR2 130B, as described above. In some examples, the example communications of FIG. 3 may include additional or alternative steps. In some examples, FIG. 3 may include fewer steps than illustrated. For instance, an early move notification (e.g., steps 306 and/or 308) may be sent to one ToR instead of both ToRs).

As illustrated, at 302, the orchestrator 124 may maintain a database. In some examples, the database corresponds to database 128. In some examples, the database may comprise mappings of connectivity between vSwitch(es) 132 and ToR(s) 130 (and/or VTEPs). In some examples, the mappings can be generated and built by the orchestrator 124 built based on link layer LLDP/CDP connectivity information. In some examples. the connectivity information may be populated by a user of the service network 104. Accordingly, by maintaining the database, the orchestrator may be aware of an old location of a virtual machine, as well as a new location where the virtual machine is being moved and/or scheduled to be moved to at a future time.

At 304, the orchestrator 124 may determine that a virtual machine is scheduled to be moved from location A to location B. For instance, by accessing information in the database, the orchestrator 124 may identify one or more virtual machine(s) associated with a migration to a new location.

At 306, the orchestrator 124 may send an early move notification comprising the IP-MAC binding information for the virtual machine to ToR1 130A. For instance, the orchestrator 124 may utilize a management plane workflow to send the IP-MAC binding information. In some examples, the IP-MAC binding information may be sent as part of a packet that is signed using a private and/or public key. In some examples, the signature and/or the early move notification may be encrypted using the key. In some examples, ToR1 130A may store a corresponding key that enables ToR1 130A to decrypt the packet and/or verify the signature of the orchestrator 124.

At 308, the orchestrator 124 may send an early move notification comprising the IP-MAC binding information for the virtual machine to ToR2 130B. For instance, the orchestrator 124 may utilize a management plane workflow to send the IP-MAC binding information. In some examples, the IP-MAC binding information may be sent as part of a packet that is signed using a private and/or public key. In some examples, ToR2 130B may store a corresponding key that enables ToR2 130B to decrypt the packet and/or verify the signature of the orchestrator 124.

At 310, ToR1 130A may update the reachability information of the virtual machine. For instance, ToR1 130A may decrypt the packet and/or verify the signature of the orchestrator 124 and may update the IP-MAC binding information based on the verification. In some examples, updating the reachability information comprises storing the IP-MAC binding information in association with the virtual machine.

At 312, ToR2 130B may update the reachability information of the virtual machine. For instance, ToR2 130B may decrypt the packet and/or verify the signature of the orchestrator 124 and may update the IP-MAC binding information based on the verification. In some examples, updating the reachability information comprises storing the IP-MAC binding information in association with the virtual machine.

At 314, ToR1 130A may advertise updated reachability information for the virtual machine to the spine 120 and/or the rest of the network. For instance, the updated reachability information may be advertised using the route reflector 214.

At 316, ToR2 130B may advertise updated reachability information for the virtual machine to the spine 120 and/or the rest of the network. For instance, the updated reachability information may be advertised using the route reflector 214.

Accordingly, by In this way, the reachability information at ToR1 130A and/or ToR2 130B can be updated to point to the new location, such that network convergence can occur even before the virtual machine move has finished. Moreover, by utilizing a pre-shared key (e.g., private or public key) with the ToRs, the techniques described herein prevent spoofing scenarios, thereby ensuring that the action will only be taken for authentic moves of virtual machines.

Figure 4:
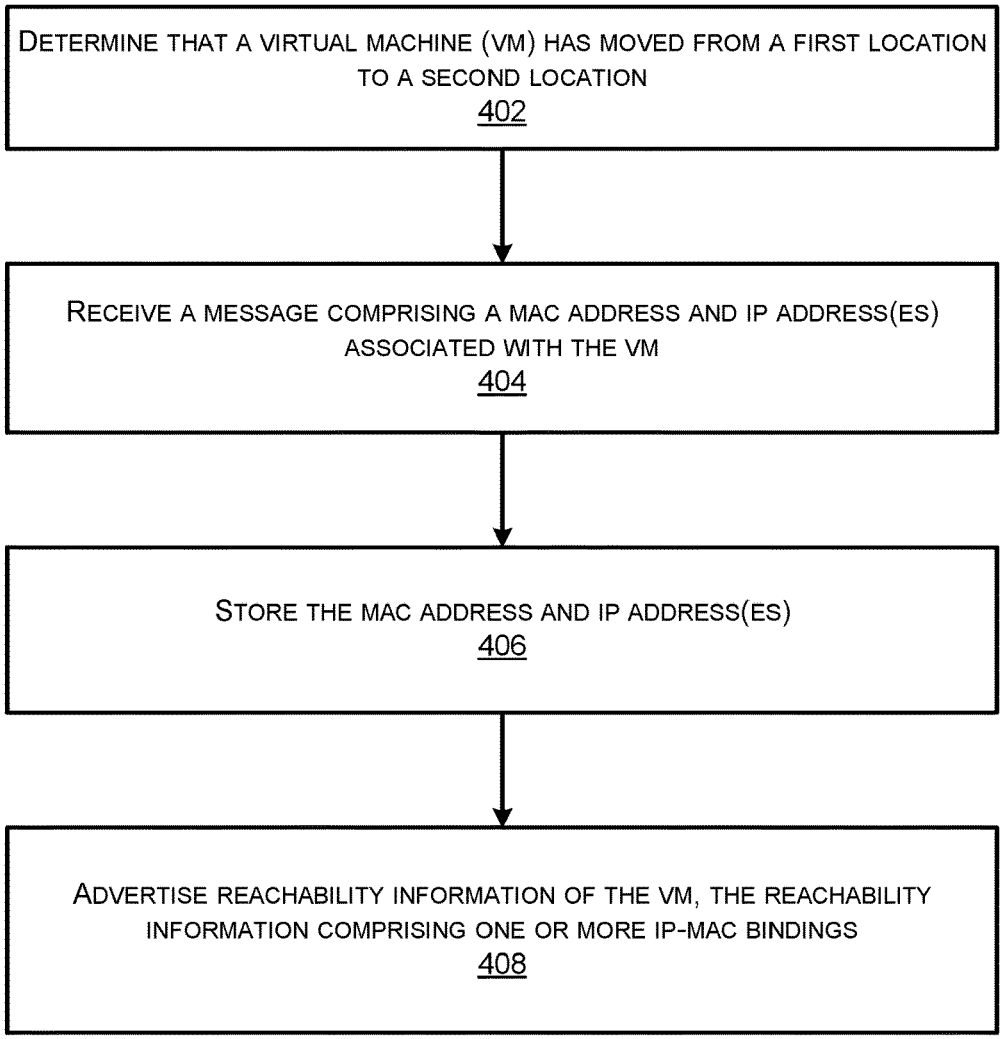
FIG. 4 illustrates a flow diagram of an example method for 400 for improved network convergence of endpoints in virtual machine mobility scenarios.

FIG. 4 illustrates a flow diagram of an example method 400 for improved network convergence of endpoints in virtual machine mobility scenarios. In some examples, the method 400 is implemented by and/or associated with a control plane of a network. In some instances, the techniques may be performed by a system (e.g., one or more devices), such as the leaf(s) 116, spine(s) 120, ToR(s) 130, server(s) 108, virtual switch(es) 132, virtual machine(s) 110, hypervisor(s) 112, a combination thereof, and/or any other devices (e.g., hardware offload chips and/or any other device). The techniques of method 400 may be performed by a system that includes one processor, or more than one processor.

At 402, the system may determine that a virtual machine has moved from a first location to a second location. In some examples, the first location is associated with a first top of rack (ToR) switch of a plurality of ToRs switches within the network, and the second location being associated with a second ToR of the plurality of ToRs. In some examples, the virtual machine is one of a plurality of virtual machines being migrated to the second location.

At 404, the system may receive a message comprising a MAC address and IP address(es) associated with the virtual machine. In some examples, the message is sent by a virtual switch or a hypervisor associated with the VM at the first location.

At 406, the system may store the MAC address and IP address(es). In some examples, the MAC address and the one or more IP addresses are stored by a network module within a hypervisor at the second location. In some examples, the MAC address and IP address(es) are stored by a virtual switch as the second location.

At 408, the system may advertise reachability information of the virtual machine, the reachability information comprising one or more IP-MAC bindings. In some examples, the reachability information may comprise IP address(es), MAC address(es), and/or information regarding whether the virtual machine can receive traffic. In some examples, the second ToR at the second location advertises the reachability information using a BGP EVPN protocol. In some examples, the advertising may occur at a time prior to the migration being completed.

In some examples, the system may inject, at the second location, the MAC address, the one or more IP addresses into an advertisement message, the advertisement message comprising an updated mobility sequence number. In this example, the may may further advertise, by the second ToR and to a route reflector, the advertisement message indicating reachability of the VM at the second location, wherein the route reflector: stores the second location based at least in part on the updated mobility sequence number; and advertises, to the plurality of ToRs, the advertisement message, such that traffic directed to the first location is forwarded to the second location. In some examples, the advertisement message comprises a BGP EVPN Route-type 2 message.

In some examples, the system may receive, by the first ToR at the first location, data associated with the MAC address of the VM. In this example, the system may determine, by the first ToR, the one or more IP addresses associated with the MAC address; and based at least in part on the MAC address and the one or more IP addresses, poison, by the first ToR, a route to the first location within the network. In some examples, the data is sent by a network module of a hypervisor of the VM at the first location to the first ToR via a RARP packet. In some examples, the data is sent by a virtual switch at the first location.

Figure 5:
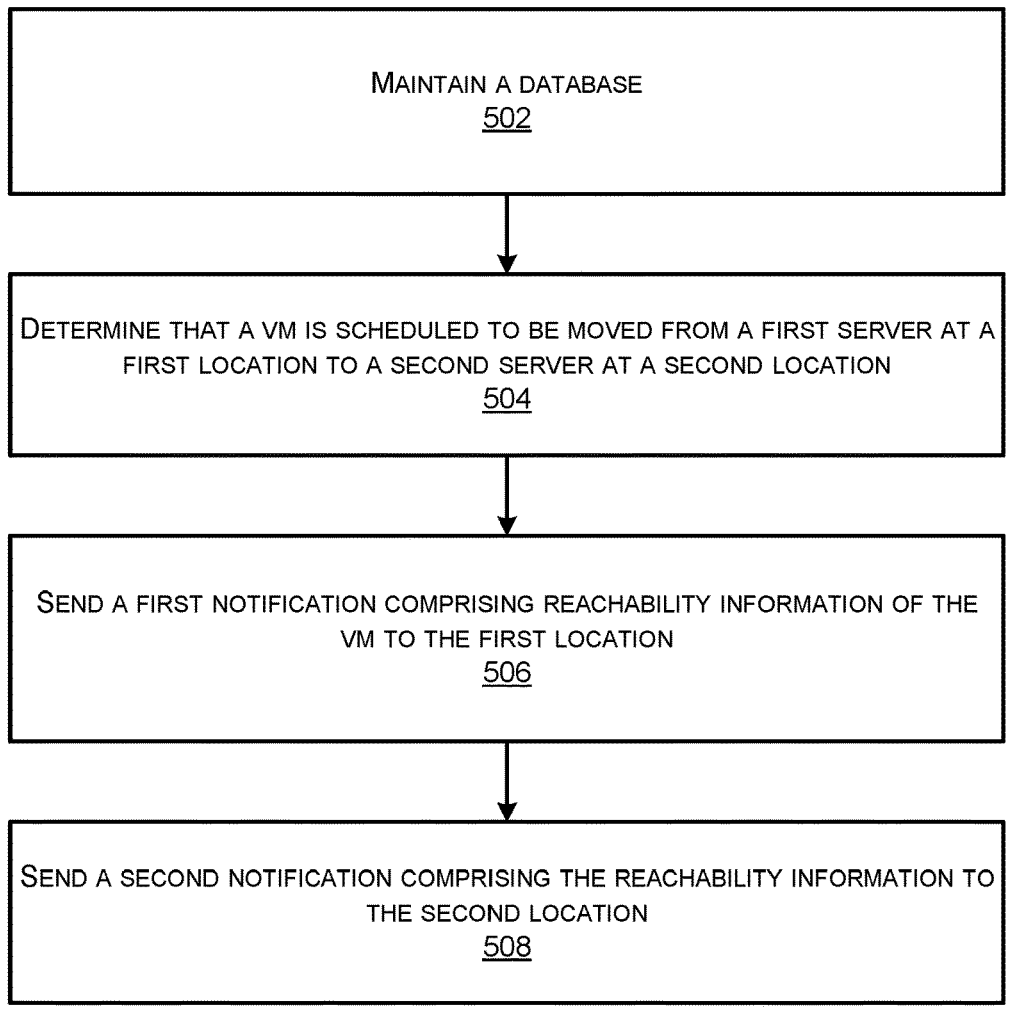
FIG. 5 illustrates a flow diagram of an example method for improved network convergence of endpoints in virtual machine mobility scenarios.

FIG. 5 illustrates a flow diagram of an example method 500 for improved network convergence of endpoints in virtual machine mobility scenarios. In some examples, the method 500 may be implemented at a management plane of a network. In some instances, the techniques may be performed by a system (e.g., one or more devices), such as the orchestrator 124, spine 120, a combination thereof, and/or any other devices (e.g., hardware offload chips and/or any other device). The techniques of method 500 may be performed by a system that includes one processor, or more than one processor. For instance, the orchestrator 124 may correspond to a virtual machine orchestrator (e.g., VMware vCenter, OpenStack, or any other suitable orchestrator).

At 502, the system may maintain a database. In some examples, the database may comprise mapping(s) of connectivity information between virtual switch(es) associated with virtual machine(s) and leaf node(s) of a network. For instance, the database may correspond to database 128. As noted above, the database may comprise mappings of connectivity between vSwitch(es) 132 and ToR(s) 130 (and/or VTEPs) associated with location(s) 106. In some examples, the mappings can be generated and built by the orchestrator 124 built based on link layer LLDP/CDP connectivity information. In some examples. the connectivity information may be populated by a user of the service network 104. Accordingly, by maintaining the database, the orchestrator 124 may be aware of an old location of a virtual machine, as well as a new location where the virtual machine is being moved and/or scheduled to be moved to at a future time.

At 504, the system may determine that a virtual machine is scheduled to be moved from a first server associated with a first location to a second server associated with a second location. In some examples, the system may receive input from a user of the service network to schedule a move of one or more virtual machine(s). In some examples, the system may determine that a virtual machine is scheduled to be moved at a further period of time. For instance, the future period of time may correspond to scheduling optimizations, maintenance windows, better utilization, power efficiency, decommissioning, upgrades, etc. In some examples, the system may determine that the virtual machine is scheduled to be moved as part of a current migration of a plurality of virtual machines from the first location to the second location.

At 506, the system may send a first notification comprising reachability information of the virtual machine to the first location. In some examples the first notification may correspond to an early move notification. In some examples, the first notification may comprise IP-MAC binding information for the virtual machine. For instance, the orchestrator may utilize a management plane workflow to send the IP-MAC binding information to a ToR (and/or VTEP) at the leaf node of the first location. In some examples, the reachability information may include an indication of the second location to enable the first ToR to update the reachability information of the VM to the second location In some examples, the IP-MAC binding information may be sent as part of a packet that is signed using a private and/or public key. In some examples, the leaf node at the first location may store a corresponding key that enables the first location to decrypt the packet and/or verify the signature of the orchestrator.

At 508, the system may send a second notification comprising reachability information of the virtual machine to the second location. In some examples the second notification may correspond to an early move notification. In some examples, the second notification may comprise IP-MAC binding information for the virtual machine. For instance, the orchestrator may utilize a management plane workflow to send the IP-MAC binding information to a ToR (and/or VTEP) at the leaf node of the second location. In some examples, the reachability information may include an indication of the second location to enable the second location to update the reachability information of the VM to the second location In some examples, the IP-MAC binding information may be sent as part of a packet that is signed using a private and/or public key. In some examples, the leaf node at the second location may store a corresponding key that enables the second location to decrypt the packet and/or verify the signature of the orchestrator.

As noted above, the first notification and/or the second notification may be sent at a time prior to the VM being moved to the second location.

Figure 6:
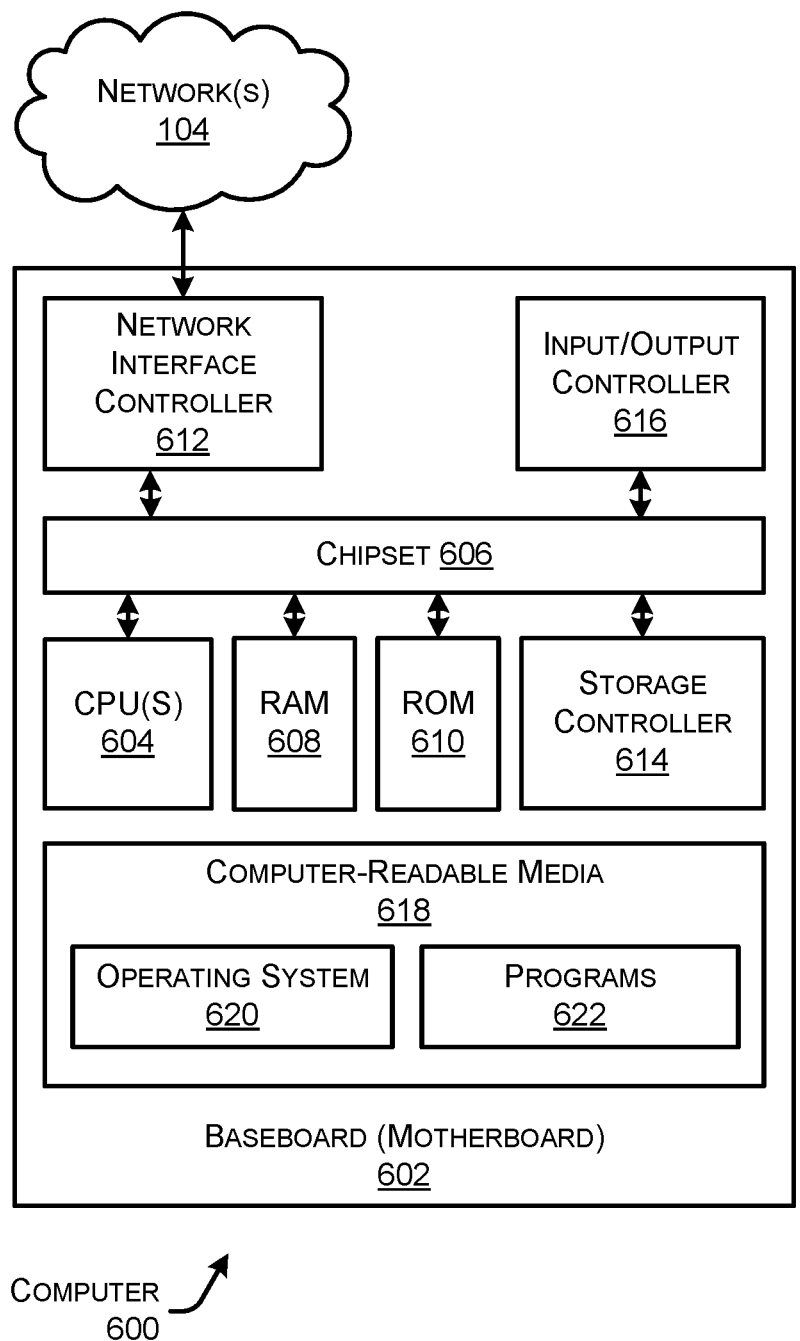
FIG. 6 is a computer architecture diagram showing an illustrative computer hardware architecture for implementing a server device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to an orchestrator 124, a spine 120, a leaf 116, a server 108, a virtual machine 110, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as service network(s) 104. The chipset 606 can include functionality for providing network connectivity through a NIC 612, such as a gigabit Ethernet adapter. The NIC 612 is capable of connecting the computer 600 to other computing devices over the network(s) 104. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the correspond to the orchestrator 124, spine 120, leaf 116, server 108, virtual machine 110, and/or any components included therein, may be supported by one or more devices similar to computer 600. Stated otherwise, some or all of the operations performed by the orchestrator 124, spine 120, leaf 116, server 108, virtual machine 110, and/or any components included therein, may be performed by one or more computers 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of an orchestrator 124, spine 120, leaf 116, server 108, virtual machine 110, and/or any other device. The computer 600 may include one or more hardware processors (e.g., such as CPUs 604 (processors)) configured to execute one or more stored instructions. The processor(s) may comprise one or more cores. Further, the computer 600 may include one or more network interfaces configured to provide communications between the computer 600 and other devices, such as the communications described herein as being performed by the orchestrator 124, spine 120, leaf 116, server 108, virtual machine 110, and/or any other device. The network interfaces may include devices configured to couple to personal area networks (PANs), user defined networks (UDNs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for improving network convergence within data center network fabrics. For instance, the programs 622 may cause the computer 600 to perform techniques including determining that a virtual machine (VM) is moved from a first location to a second location, the first location being associated with a first top of rack (ToR) of a plurality of ToRs within the network, and the second location being associated with a second ToR of the plurality of ToRs. The techniques may include receiving, at the second location, a message comprising a MAC address and one or more IP addresses associated with the VM. The techniques may also include storing, at the second location, the MAC address associated with the VM and the one or more IP addresses associated with the VM. The method may further include advertising, by the second location and to the plurality of ToRs, reachability information of the VM, the reachability information comprising one or more IP-MAC bindings.

Additionally, or alternatively the programs 622 may cause the computer 600 to perform techniques including: maintaining, by the VM orchestrator, a database comprising mappings of connectivity information between network modules of VMs and leaf nodes of the network. The techniques may include determining that a VM is scheduled to be moved from a first server associated with a first ToR at a first location to a second server associated with a second ToR at a second location. The techniques may further include sending, to the first ToR at the first location, a first notification comprising reachability information of the VM, the reachability information including an indication of the second location to enable the first ToR to update the reachability information of the VM to the second location. The techniques may include sending, to the second ToR at the second location, a second notification comprising the reachability information of the VM to enable the second ToR to update the reachability information of the VM to the second location.

In this way, network traffic may start flowing to the VM as soon as the VM powers up and is able to accept traffic. Thus, as the network has already converged, the system does not need to handle any RARP based broadcast packets at the old location. Accordingly, network transmissions may be reduced, thereby improving network speed. Further, convergence time to the new location of the VM is reduced, thereby reducing downtime of the VM. Moreover, by utilizing the route reflector to update the first location, the techniques enable all traffic directed to the virtual machine at the first ToR to be re-routed to the second location automatically, thereby preventing the traffic from being dropped. Further, by proactively poisoning the route to the virtual machine at the first location, the techniques notify the network of the virtual machine being moved, thereby preventing traffic from being sent to the first ToR. Further, the techniques enable an orchestrator to make the ToR(s) at the leaf nodes aware of the impending move of the virtual machine, such that the ToR(s) can proactively advertise the IP/MAC reachability of the virtual machine even prior to the VM move finishing.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method associated with a control plane of a network, comprising:
   determining that a virtual machine (VM) is moved from a first location to a second location, the first location being associated with a first switch of a plurality of switches within the network, and the second location being associated with a second switch of the plurality of switches;
   prior to a move of the VM from the first location to the second location being completed, receiving, at the second switch, a message comprising a MAC address and one or more IP addresses associated with the VM, wherein the message is sent from the first switch;
   storing, at the second switch, the MAC address associated with the VM and the one or more IP addresses associated with the VM; and
   advertising, by the second switch and to the plurality of switches, reachability information of the VM, the reachability information comprising one or more IP-MAC bindings, the reachability information being advertised prior to the move of the VM being completed.

2. The method of claim 1, wherein the second switch at the second location advertises the reachability information using a BGP EVPN protocol.

3. The method of claim 1, wherein the MAC address and the one or more IP addresses are stored by a networking module within a hypervisor at the second location.

4. The method of claim 1, wherein the message is sent by a virtual switch or a hypervisor associated with the VM at the first location.

5. The method of claim 1, wherein the VM is one of a plurality of VMs being migrated to the second location, and wherein the advertising occurs at a time prior to the migration being completed.

6. The method of claim 1, further comprising:
injecting, at the second location, the MAC address, the one or more IP addresses into an advertisement message, the advertisement message comprising an updated mobility sequence number; and
advertising, by the second switch and to a route reflector, the advertisement message indicating reachability of the VM at the second location, wherein the route reflector:
stores the second location based at least in part on the updated mobility sequence number; and
advertises, to the plurality of switches, the advertisement message, such that traffic directed to the first location is forwarded to the second location.

7. The method of claim 6, wherein the advertisement message comprises a BGP EVPN Route-type 2 message.

8. The method of claim 1, further comprising:
receiving, by the first switch at the first location, data associated with the MAC address of the VM;
determining, by the first switch, the one or more IP addresses associated with the MAC address; and
based at least in part on the MAC address and the one or more IP addresses, poisoning, by the first switch, a route to the first location within the network.

9. The method of claim 8, wherein the data is sent by a networking module of a hypervisor of the VM at the first location to the first switch via a RARP packet.

10. A system comprising:
one or more processors; and
one or more computer-readable media storing instructions that, when executed by the one or more processors, cause the one or more processors to perform operations comprising:
determining that a virtual machine (VM) is moved from a first location to a second location, the first location being associated with a first switch of a plurality of switches within a network, and the second location being associated with a second switch of the plurality of switches;
prior to a move of the VM from the first location to the second location being completed, receiving, at the second switch, a message comprising a MAC address and one or more IP addresses associated with the VM, wherein the message is sent from the first switch;
storing, at the second switch, the MAC address associated with the VM and the one or more IP addresses associated with the VM; and
advertising, by the second switch and to the plurality of switches, reachability information of the VM, the reachability information comprising one or more IP-MAC bindings, the reachability information being advertised prior to the move of the VM being completed.

11. The system of claim 10, wherein the second switch at the second location advertises the reachability information using a BGP EVPN protocol.

12. The system of claim 10, wherein the MAC address and the one or more IP addresses are stored by a networking module within a hypervisor at the second location.

13. The system of claim 10, wherein the message is sent by a virtual switch or a hypervisor associated with the VM at the first location.

14. The system of claim 10, wherein the VM is one of a plurality of VMs being migrated to the second location, and wherein the advertising occurs at a time prior to the migration being completed.

15. The system of claim 10, the operations further comprising:
injecting, at the second location, the MAC address, the one or more IP addresses into an advertisement message, the advertisement message comprising an updated mobility sequence number; and
advertising, by the second switch and to a route reflector, the advertisement message indicating reachability of the VM at the second location, wherein the route reflector:
stores the second location based at least in part on the updated mobility sequence number; and
advertises, to the plurality of switches, the advertisement message, such that traffic directed to the first location is forwarded to the second location.

16. The system of claim 15, wherein the advertisement message comprises a BGP EVPN Route-type 2 message.

17. The system of claim 10, the operations further comprising:
receiving, by the first switch at the first location, data associated with the MAC address of the VM;
determining, by the first switch, the one or more IP addresses associated with the MAC address; and
based at least in part on the MAC address and the one or more IP addresses, poisoning, by the first switch, a route to the first location within the network.

18. The system of claim 17, wherein the data is sent by a networking module of a hypervisor of the VM at the first location to the first switch via a RARP packet.

19. One or more non-transitory computer-readable media storing computer-readable instructions that, when executed by one or more processors, cause the one or more processors to perform operations comprising:
determining that a virtual machine (VM) is moved from a first location to a second location, the first location being associated with a first switch of a plurality of switches within a network, and the second location being associated with a second switch of the plurality of switches;
prior to a move of the VM from the first location to the second location being completed, receiving, at the second switch, a message comprising a MAC address and one or more IP addresses associated with the VM, wherein the message is sent from the first switch;
storing, at the second switch, the MAC address associated with the VM and the one or more IP addresses associated with the VM; and
advertising, by the second switch and to the plurality of switches, reachability information of the VM, the reachability information comprising one or more IP-MAC bindings, the reachability information being advertised prior to the move of the VM being completed.

20. The one or more non-transitory computer-readable media of claim 19, the operations further comprising:
   injecting, at the second location, the MAC address, the one or more IP addresses into an advertisement message, the advertisement message comprising an updated mobility sequence number; and
   advertising, by the second switch and to a route reflector, the advertisement message indicating reachability of the VM at the second location, wherein the route reflector:
      stores the second location based at least in part on the updated mobility sequence number; and
      advertises, to the plurality of switches, the advertisement message, such that traffic directed to the first location is forwarded to the second location.

* * * * *